United States Patent
Baugher

(10) Patent No.: US 7,340,769 B2
(45) Date of Patent: Mar. 4, 2008

(54) SYSTEM AND METHOD FOR LOCALIZING DATA AND DEVICES

(75) Inventor: Mark John Baugher, Portland, OR (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 11/260,531

(22) Filed: Oct. 26, 2005

(65) Prior Publication Data

US 2006/0156392 A1    Jul. 13, 2006

Related U.S. Application Data

(63) Continuation-in-part of application No. 11/075,197, filed on Mar. 7, 2005, and a continuation-in-part of application No. 11/032,764, filed on Jan. 7, 2005.

(51) Int. Cl.
G06F 7/04 (2006.01)
H04L 9/00 (2006.01)

(52) U.S. Cl. .......................... 726/5; 713/151; 713/168; 713/185

(58) Field of Classification Search .................... 726/5; 713/151, 168, 185
See application file for complete search history.

(56) References Cited

U.S. PATENT DOCUMENTS 6,065,120 A  *  5/2000  Laursen et al. ................ 726/5
6,438,550 B1 *  8/2002  Doyle et al. ................... 707/9
6,452,925 B1 *  9/2002  Sistanizadeh et al. ....... 370/352
6,675,208 B1 *  1/2004  Rai et al. ..................... 709/224
6,988,210 B1 *  1/2006  Audebert ....................... 726/9
6,993,580 B2 *  1/2006  Isherwood et al. .......... 709/225
7,103,769 B1 *  9/2006  Fleming et al. ............. 713/151
2002/0112186 A1* 8/2002  Ford et al. .................. 713/201
2003/0216143 A1* 11/2003 Roese et al. ............. 455/456.1
2003/0229792 A1* 12/2003 Baldwin et al. ............ 713/185
2003/0236991 A1* 12/2003 Letsinger .................... 713/200
2004/0123152 A1* 6/2004  Le Saint ..................... 713/201
2004/0168062 A1  8/2004  Isozaki et al.
2005/0063333 A1* 3/2005  Patron et al. ............... 370/329
2005/0228874 A1* 10/2005 Edgett et al. ............... 709/220
2005/0229004 A1* 10/2005 Callaghan ................... 713/185
2005/0246529 A1* 11/2005 Hunt et al. .................. 713/168
2006/0010442 A1* 1/2006  Desai et al. ................. 718/100

OTHER PUBLICATIONS www.dtcp.com, "5C Digital Transmissio Content Protection White Paper," 15 pages total, Jul. 14, 1998, Hitachi, Ltd., Intel Corporation, Matsushita Electric Industrial, Co., Ltd., Sony Corporation, Toshiba Corporation; www.dtcp.com/data/wp_spec.pdf.

* cited by examiner

Primary Examiner—Emmanuel L. Moise
Assistant Examiner—Techane J. Gergiso
(74) Attorney, Agent, or Firm—Stolowitz Ford Cowger LLP

(57) ABSTRACT

Methods and devices controlling access to content are described. For example, a request to enroll a device is received at a localization hub. The localization hub is associated with a subscriber that is authorized to access the content. A credential is issued to the device. The credential demonstrates that the device is enrolled in the local area network and is authorized to receive the content.

16 Claims, 14 Drawing Sheets

|  | DHCP-BASED NETWORK SERVICE ||
|  | SAME SUBNET AS DEVICE | SAME CREDENTIAL AS DEVICE |
| HOUSEHOLD DEVICE | TRUE | TRUE |
| MOBILE DEVICE | FALSE | TRUE |
| VISITOR DEVICE | TRUE | FALSE |
| FOREIGN DEVICE | FALSE | FALSE |

|  | DHCP-BASED NETWORK SERVICE | |
|---|---|---|
|  | SAME SUBNET AS DEVICE | SAME CREDENTIAL AS DEVICE |
| HOUSEHOLD DEVICE | TRUE | TRUE |
| MOBILE DEVICE | FALSE | TRUE |
| VISITOR DEVICE | TRUE | FALSE |
| FOREIGN DEVICE | FALSE | FALSE |

SYSTEM AND METHOD FOR LOCALIZING DATA AND DEVICES

RELATED APPLICATION

This Application is a Continuation-in-Part of the co-pending, commonly-owned U.S. patent application, Ser. No. 11/075,197, filed Mar. 7, 2005, by A. Huotari and M. Baugher and entitled "Remote Access to Local Content Using Transcryption of Digital Rights Management Schemes," which in turn is a Continuation-in-Part of the co-pending, commonly-owned U.S. patent application, Ser. No. 11/032,764, filed Jan. 7, 2005, by M. Baugher and entitled "Using a Network-Service Credential for Access Control," each application incorporated herein by reference in their entirety.

TECHNICAL FIELD

Embodiments of the present invention pertain to controlling access to content residing on a network.

BACKGROUND ART

Content protection systems are typically defined by a specification. A consortium of companies will develop the specification, and a separate licensing authority will license the specification to other companies. For example, Digital Transmission Content Protection (DTCP) was created by a consortium of companies; however, the specification is administered and licensed by the Digital Transmission Licensing Authority (DTLA).

The rights holder of a copyrighted work may choose to license the work to certain types of devices but not to others. A copyrighted movie, for example, may be licensed to play only on digital video disk (DVD) player devices that are licensed by the DVD Copy Control Association (DVD CCA).

The manufacturers of such devices comply with licensing authority policies regarding hardware configuration, software configuration and the processing of licensed data. A compliant device will use the protocols and algorithms of the particular licensing authority.

There are many protocols and algorithms from various licensing authorities. For instance, a licensed device may be required to have digital video outputs that are protected by the High Definition Content Protection (HDCP) standard. Digital Video Interface (DVI) and High Definition Multi-Media Interface (HDMI) devices use HDCP. In the case of DVD technology, for example, the manufacturer of compliant devices will use the DVD CCA's Content Scramble System (CSS) and will receive a CSS key from the licensing authority. As mentioned above, DTLA administers licenses to compliant IEEE 1394 and USB 2.0 devices that process content according to the DTCP standard. The DTLA also licenses DTCP/IP (Internet Protocol) technology for devices that operate over IP networks. License Management International (LMI) administers licenses to compliant DVD recording devices and issues cryptographic keys so that the device can run the Content Protection for Recordable Media (CPRM) protocols and algorithms. The Content Management Licensing Administrator (CMLA) licenses devices that comply with the Open Mobile Alliance's Digital Rights Management version 2 (OMA DRM 2) standard.

In addition to controlling the type of devices licensed for copyrighted works, rights holders are also interested in where the devices are located. For example, television content is typically licensed to a household, while music may be licensed to an individual. This constraint is commonly called "localization."

Unlike DTCP/IP and OMA DRM 2, many licensed devices operate over a particular type of transmission medium such as a computer bus or removable disc. With IP networking, however, such devices can be network-accessible throughout the home as well as practically anywhere else on earth. This reality of IP networking poses a problem for business models and security policies that attempt to place localization constraints on devices and data. A device and/or method that can address this type of problem, considering the many protocols and algorithms used by the various licensing authorities, would be advantageous.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," "converting," "authenticating," "authorizing," "identifying," "forwarding" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Localization of Data or a Network Device by a Hub

Figure 1:
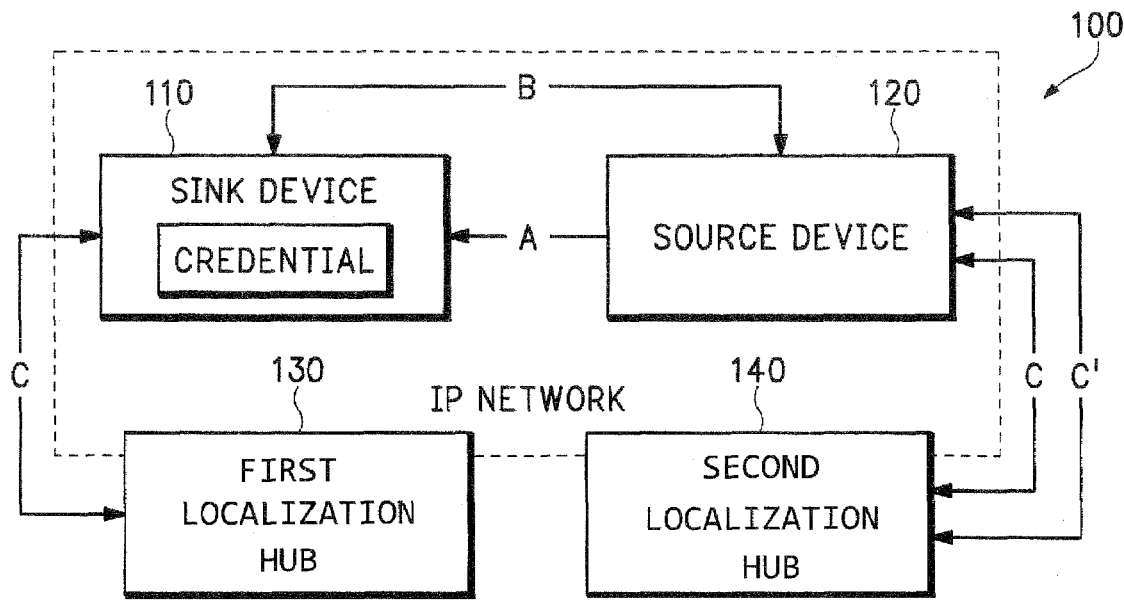
FIG. 1 is a block diagram of a network according to an embodiment of the present invention.

FIG. 1 is a block diagram of a network 100 according to an embodiment of the present invention. In one embodiment, network 100 is a representation of a household or home network with devices on the network. In another embodiment, network 100 is a representation of an enterprise network with devices on the network.

In the example of FIG. 1, the network 100 includes a sink device 110 upon which embodiments of the present invention can be implemented, a source device 120, a first localization hub 130, and a second localization hub 140. Hub 130 can service both source and sink in a localized network such as a network of DTCP/IP devices. An advantage of the present invention is in allowing the source to be remote to the sink beyond the seven (7) milli-second and three (3) hop localization constraints of DTCP/IP. In the remote case, there may be two hubs that localize devices by household or affinity group. In the example of FIG. 1, all devices are at least connected to a private network (e.g., a household or enterprise network), and may be connected to a public network as well (e.g., an Internet point of presence operated by an Internet service provider). The private network can include more elements than the example illustrated in the figures. Also, there can be additional hub, source or sink devices located on the private network. Furthermore, a home network may consist of multiple networks (e.g., multiple local area networks).

Continuing with FIG. 1, in one embodiment, the sink device 110 attempts to receive data from a source device 120 along arc A. In one embodiment, the data is encrypted and the sink device 110 requests a decryption key from the source device 120 or some third device along arc B. Such key establishment algorithms, in which a requester presents a credential to a responder who uses it to authorize access, are well known. In FIG. 1, the requester is the sink device 110 and its authorizing credential is the network-service credential, which was obtained earlier in the enrollment process by an arc C exchange. In the present embodiment, the sink device 110 secures the arc C exchange with IP Security (IPsec) protocols; it is well known in the art of network security to use the Internet Key Exchange (IKE) to establish a secure connection when each party proves its authorization using digital certificates singed by an authority. An embodiment of the present invention uses Digital Transmission License Authority (DTLA) credentials for this purpose. The credentials are initialized in sink device 110 memory (e.g., the credential for the device identity is in memory along with the root public key for the DTLA authority). In one embodiment, the source device 120 and sink device 110 mutually authenticate using their respective keys and DTLA credentials. In one embodiment of the present invention, sink device 110 additionally passes its network-service credential to prove that it has enrolled with a localization hub on the particular network service, and source device 120 uses this credential for authorization purposes (e.g., to conditionally allow access to content works that are restricted to devices that are enrolled on a particular network). In one embodiment, a network device or hub obtains the network-service credential from an Internet service provider; this localizes the hub or device to a network-service interface, and the localization uses a physical interface when the hub is co-resident with a modem such as a cable DOCSIS (Data Over Cable Service Interface Specification) modem.

In an embodiment, the hub device 130 and sink device 110 mutually authenticate using the DTLA credential when the sink device has no network-service credential. Each device uses a pair of DTLA and network service credentials subsequent to the first network-service enrollment.

Alternative embodiments may use other authorities instead of or in addition to the DTLA, such as the Content Management License Administration (CMLA) of the Open Mobile Alliance (OMA) or proprietary systems such as Microsoft DRM 10 that incorporate the localization functions of the present invention.

In one embodiment, the arc C exchange occurs entirely within a household network between the sink device and the hub device, which also runs a Dynamic Host Configuration Protocol (DHCP) server of administratively scoped IP addresses. In another embodiment, the hub uses Universal Plug and Play (UPnP) protocols to speak to home network devices for discovery or other purposes. In another embodiment, the arc C exchange occurs between the home network device and a service provider's equipment to obtain the service provider's network-service credential from its hub. This localizes the credential to a network service interface such as a broadband network interface in cable or digital subscriber line (DSL) modems. In yet another embodiment, the arc C' exchange occurs in which a device can obtain or query additional credentials when the service is multi-homed. (A multi-homed device has more than one network-service interface each with its own network-service credential.)

With reference to FIG. 1, transactions on the arcs are confidential and integrity-protected. In one embodiment, source, sink, and hub devices each have a public/private keypair. It is known for a licensing authority to sign a credential that contains the device's public key and thereby attest to compliance with a device license or security policy. An embodiment uses the DTLA as the licensing authority.

Figure 2:
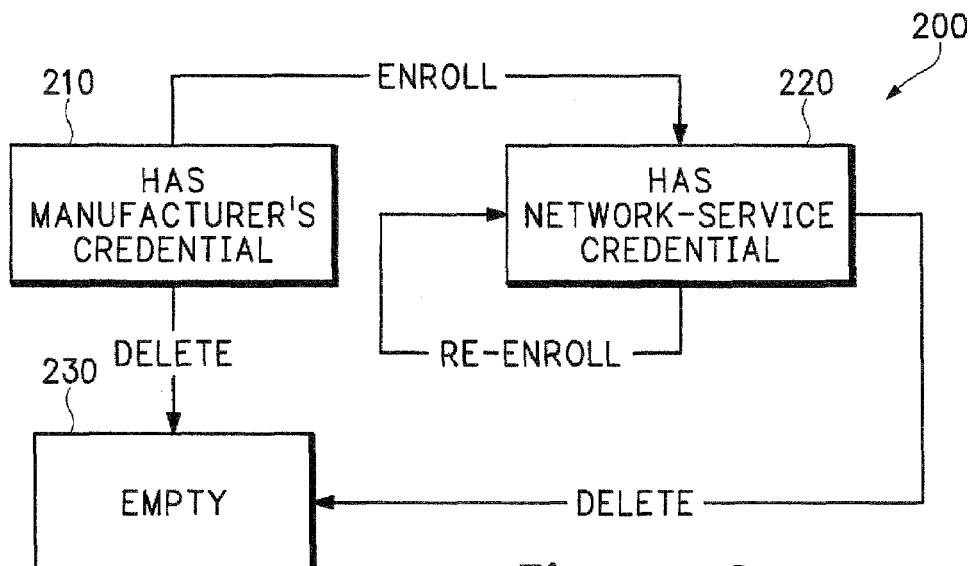
FIG. 2 is a state transition diagram in a network device that enrolls with a localization hub according to an embodiment of the present invention.

FIG. 2 is an apparatus state transition diagram 200 showing different enrollment states according to an embodiment of the present invention. This diagram defines how a network-service credential is initialized in non-volatile apparatus memory, maintained, deleted, and replaced with another credential. FIG. 2 depicts an embodiment in which a device is permitted to enroll in exactly one network service. Different embodiments may allow multiple enrollments or only count enrollments or merely track state.

According to the embodiments of the present invention, the non-volatile apparatus memory is initialized with a copy of the device manufacturer's DTLA certificate. This state is referred to in the state transition diagram 200 as "HAS MANUFACTURER'S CREDENTIAL" 210. A DELETE operation erases credential memory to disable the apparatus. This state is referred to in the state transition diagram 200 as "EMPTY" 230. An ENROLL transaction (as within arc C of FIG. 1) replaces the device-manufacturer's credential in the apparatus with a network-service credential. This state is referred to in the state transition diagram 200 as "HAS NETWORK-SERVICE CREDENTIAL" 220. Subsequent RE-ENROLL transactions (as within arc C of FIG. 1) authenticate using the current network-service credential. Network-service equipment and operators do not necessarily allow every device to automatically ENROLL or RE-ENROLL, which in an embodiment is an infrequent procedure performed by the user when the device is first installed in the residence or office, or at the time of moving to a new or different household or enterprise network. The mobile case is special because source devices may accept local credentials with non-local IP addresses such as those found outside of a home gateway. In an alternative embodiment, the network enrollment is entirely under user control and the device may be enrolled and re-enrolled entirely under user control.

Continuing with reference to FIG. 2, the ENROLL transaction according to embodiments of the present invention is further described. Rather than physical proximity, the present invention uses a logical association between a data-processing (network) device and a network-service (localization hub) device, which issues a signed credential when the particular network (source or sink) device enrolls on its network. A credential typically identifies a particular authority whose signature conveys implicit authorization for some access. The network-service credential identifies the network-service, which includes the name or address of the service provider and optional subscriber information. The name is a large (e.g., 16 byte) and random number in an embodiment, and the address is an IPv4 or IPv6 address.

Network service providers have various means to associate a subscriber with an interface to their network, including the medium access control address of a broadband modem. In one embodiment, an explicit identifier for a network subscriber is defined, which may be referred to as a "subscriber identifier (ID)." The subscriber ID conveys information that the network-service uses to identify a subscriber's home network. According to DHCP standards, the subscriber ID option is stripped off along with physical network information before the network address is passed to a subscriber's device. In one embodiment of the present invention, upon enrollment, the network-service identifier is returned to the device in the form of a digitally-signed network-service credential.

In an embodiment, an authority issues the network-service credential or delegates this role to the network operator or equipment vendor. This authority issues a certificate attesting to one or more things about a device. For multimedia devices, a licensing authority issues a digitally signed credential attesting that the device is authorized to process some class of data. Such licensing authorities exist for DVD, IEEE 1394, OMA, and digital video devices. The DTLA licenses DTCP devices on IEEE 1394 buses, IP networks, and other communications media.

In one embodiment, the apparatus uses the DTLA or some other device licensing authority as a signing authority for network-service credentials. In another embodiment, the apparatus uses the certificate authority of the network service. In yet another embodiment, the apparatus accepts equipment vendors' credentials. In these embodiments, the credential contains the cryptographic identity (e.g., the public key in an X.509 certificate) of the device and of the network service provider. The network (sink) and hub devices use these credentials in authenticated key establishment, such as in a DTCP or IKE procedure. The authority that issues the credential to the device mandates the methods for association with a network service (enrollment), disassociation with the network (revocation), and association with a new network (re-enrollment).

Figures 3, 4:
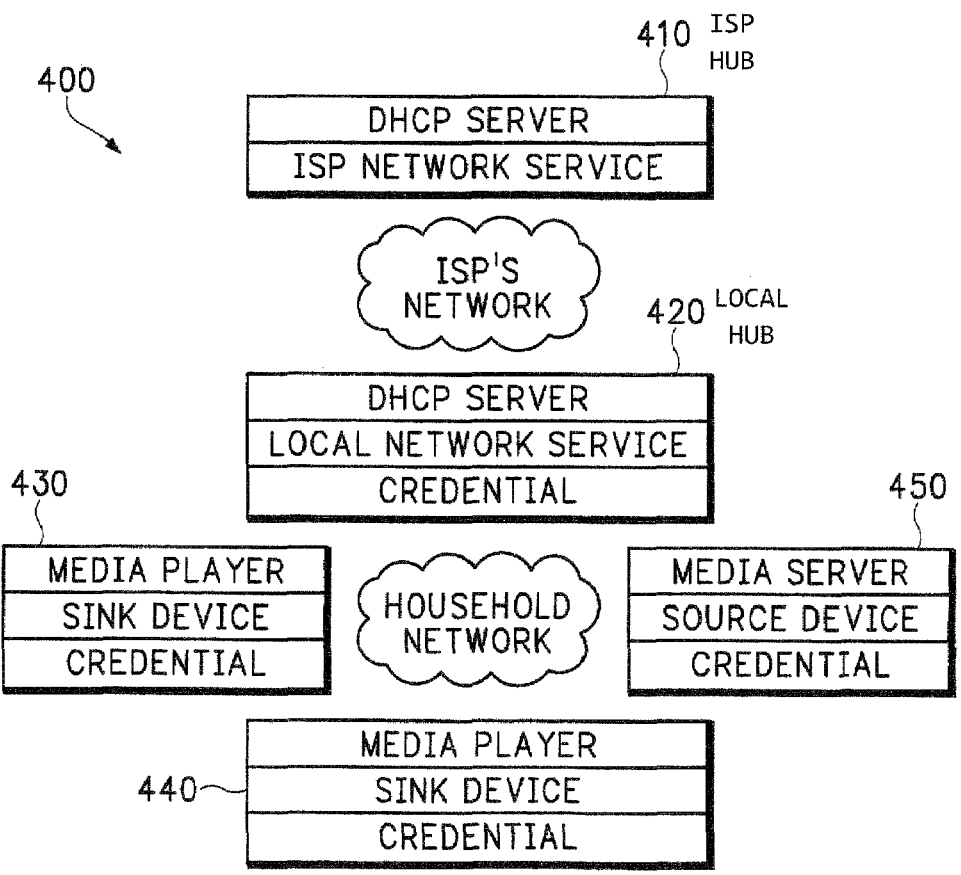
FIG. 3 is a logic table that can be used to determine the type of network device (e.g., household, mobile, visitor or foreign) that requests access to data on a network according to an embodiment of the present invention.
FIG. 4 is a block diagram showing a hub at the service provider, a hub on the household network, and network devices (source and sink) that enroll with the localization hub according to an embodiment of the present invention.

Referring now to FIG. 3, in an embodiment, distinctions such as mobile and household transactions are enumerated as shown in a truth table 300. In one embodiment, mobile operation is defined in which a device with a non-local address authenticates with a local credential. The present embodiment, therefore, uses a logical rather than a physical notion of localization for home and enterprise networks that extends to remote devices on the Internet. Furthermore, the present invention applies to networks that have no connection to the Internet and to those that have multiple Internet Service Provider (ISP) connections (e.g., are "multi-homed"). A home network typically operates among household devices even when Internet connectivity is unavailable, temporarily or permanently.

Continuing with reference to FIG. 3, the truth table 300 can be used to determine what type of device (designated herein as household, mobile, visitor, or foreign devices) is attempting to gain access to a particular network service (e.g., a server of movies or other media). In one embodiment, the truth table 300 resides in the authorization logic of a server or source device on the same network as the sink device. The type of a device attempting to gain access to data on a source device can be determined based on its IP address and network-service credential. If it were a household device attempting to gain access, it would have the same IP address range (e.g., subnet) and same network-service credential as the network-service device's apparatus. If it were a mobile device, it would have a different IP address and the same network-service credential as the network service device's apparatus. If it were a visitor device, it would have the same IP address range (e.g., subnet) and a different network-service credential network service device's apparatus. If it were a foreign device, it would have a different IP address and a different network-service credential as the network device's apparatus.

An item of content, for example, can be labeled as being available only to certain types of devices. In one embodiment, an item of content identified as being available only to household devices would only be provided to a sink device that is identified as a household device according to truth table 300.

FIG. 4 is a block diagram showing an embodiment of the household network model 400. On household network model 400, each source and sink device (430, 440 and 450) enrolls with the local hub 420, which may be co-resident with a modem and/or DHCP server in an embodiment, which in turn enrolls with the ISP localization hub 410 for the ISP's network. The local hub 420 uses a manufacturer's credential in an embodiment as its authority for issuing a network credential to a network device. In one embodiment, local hub 420 enrolls with ISP localization hub 410, which then signs a network-service credential to the home-network hub. The presence and identity of home network devices are thereby not disclosed to the ISP network service unless the hub function is located solely at the ISP and not in the home (an embodiment that relieves the household of owning and operating a localization hub). In this embodiment, hub 420 is absent and devices enroll directly with hub 410. When both hubs 410 and 420 are in operation, however, the network device may receive a pair of credentials, one for the local network service and one for the ISP's network service. Thus, a data-processing device on a home network becomes associated with a network service in the form of a credential (e.g., a signed digital certificate) for the network service. This is true in embodiments that are independent of DHCP as well as those that co-locate the network service with a DHCP server or relay.

Figure 5:
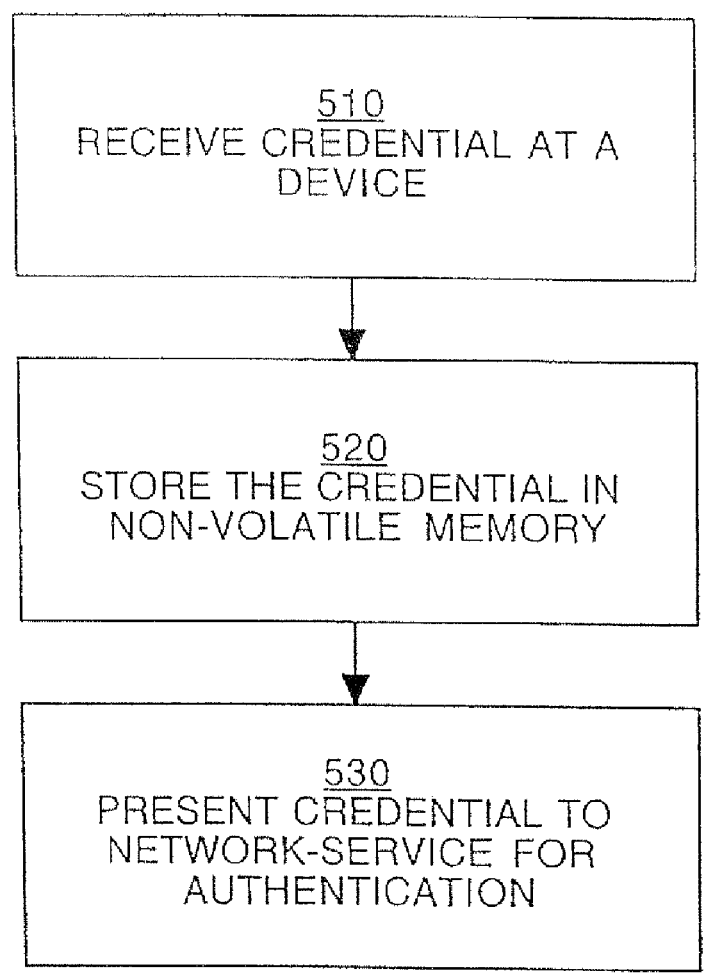
FIG. 5 is a flowchart of a method for credentialing a network device according to an embodiment of the present invention.

FIG. 5 is a flowchart of a method 500 for credentialing a device according to an embodiment of the present invention. Although specific steps are disclosed in flowchart 500, such steps are exemplary. That is, embodiments of the present invention are well suited to performing various other (additional) steps or variations of the steps recited in flowchart 500. It is appreciated that the steps in flowchart 500 may be performed in an order different than presented, and that not all of the steps in flowchart 500 may be performed.

In step 510, a credential is received at a network device in the home. The credential indicates that the device is enrolled in the network or service.

In step 520, the credential is stored in non-volatile memory on the device. The credential binds the device to the network and thus controls device access to other networks, according to the particular policies of those networks.

In step 530, the network device presents the credential as part of a request for content or service. The request may be made to the hub itself, or to a firewall that accepts the hub credentials, or to a provider of licensed data such as movies. The hub, gateway, or server, etc., uses the credential to authenticate the device, wherein upon authentication the authorized device is provided access to the service. Whether the device is authorized is determined by truth table 300 and/or other licensing constraints on the content in an embodiment. If the device has a household IP address and is enrolled on the household network, for example, it may be authorized to access household content whereas a mobile or foreign device may not be so authorized. The presentation of the credential and the authentication process are transparent to a user of the device.

In summary, a signed credential (a network-service credential) is used to enable and control data access on a network when the data is private or licensed to be localized to a particular household or home network. In general, a logical association can be used between a network device and a hub device to provide localization to a network such as a particular subscriber to a particular broadband service in a particular locale. For instance, the credential can associate a device on a home network in one city with a cable company or telephone company subscriber in another city. This localization function is useful for a hub that offers a proxy function and transcription of DRM localization schemes.

A network-service credential can be stored on a device and used to identify the network or service to which the device belongs. The device remains bound (via logical association using a network-service credential) to a particular network-service until another network-service permits re-enrollment, which is done according to the terms of a particular, licensing authority or security policy. Using a network-service credential, the device is permitted only one network-service association at a time, although multiple network-service associations may be allowed. If the network device is illegitimately bound to one network-service, however, it can be prevented from legitimately binding to any other network-service when the policy is to restrict enrollment to one network service. Those wanting, for example, data-dissemination controls on home or enterprise networks can control data transfer on, to, and from these networks.

System and Method for Localizing Data and Devices to a Hub

Figure 6:
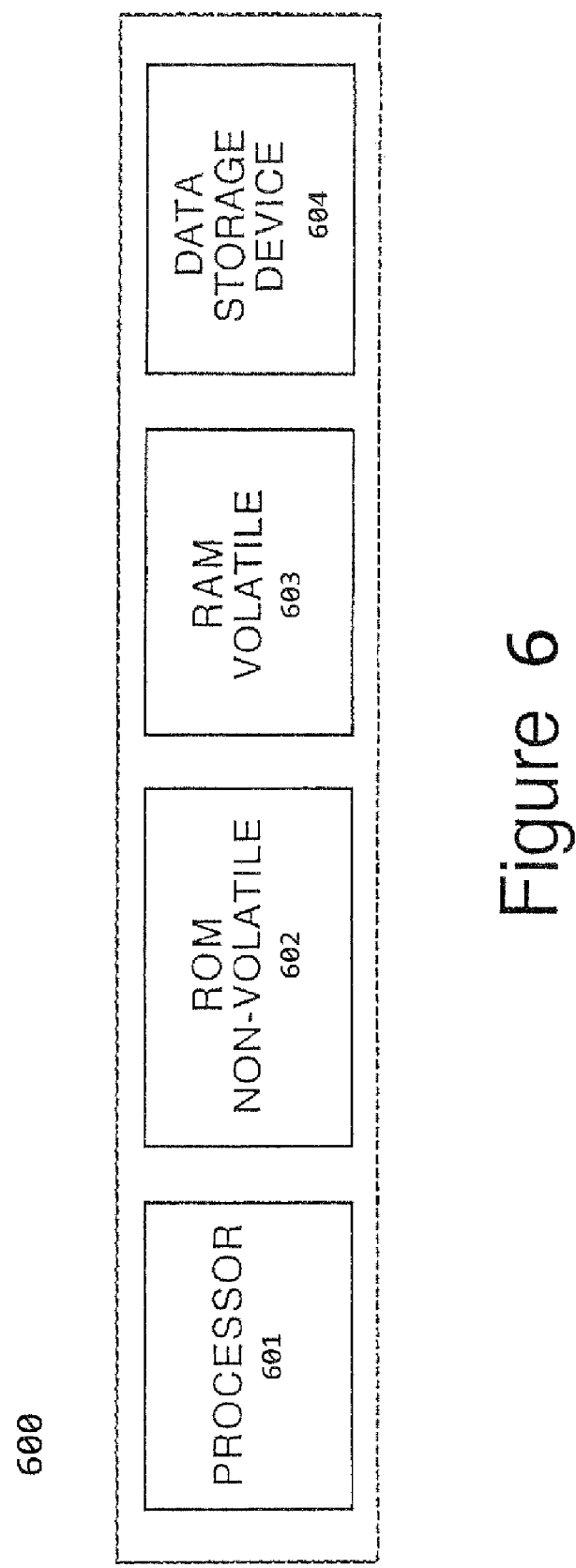
FIG. 6 is a block diagram of a device upon which embodiments of the present invention may be implemented.

FIG. 6 is a block diagram of a system 600 upon which embodiments of the present invention may be implemented. In general, system 600 includes processor 601 for processing information and instructions, random access (volatile) memory 602 for storing information and instructions for processor 601, read-only (non-volatile) memory 603 for storing static information and instructions for processor 601, and data storage device 604 such as a magnetic or optical disk and disk drive for storing content. System 600 may include an optional user output device and an optional user input device for communicating information and command selections.

As mentioned previously herein, in addition to controlling the type of devices licensed for copyrighted works, rights holders are interested in where the devices are located, a constraint commonly called "localization." According to embodiments of the present invention, system 600 is utilized as a "localization hub" that aggregates one or more licensed interfaces and provides network localization services to network devices, particularly devices that are licensed by an authority charged with controlling the distribution of copyrighted works, such as DVD CCA, DTLA, CMLA, LMI and HDCP. The hub is an aggregation of licensed interfaces and conventional network interfaces, and adds a layer of localization while remaining compliant with the localization policies of the aforementioned licensing authorities; additional information is provided in conjunction with FIG. 7, below. In general, the hub associates a network device (also referred to herein as an entertainment device, a client device or a sink or source device) with a network locale; in particular, a home network that is owned by a subscriber can be associated with a cable, telecommunications company (telco) or other broadband service. The hub may reside within the home network or at a network-service provider, as will be described in more detail below. The hub can be used to "localize" devices and data that are owned by a household or licensed to the household by association with that home network and by associating the home network with a subscription to a network service.

Figure 7:
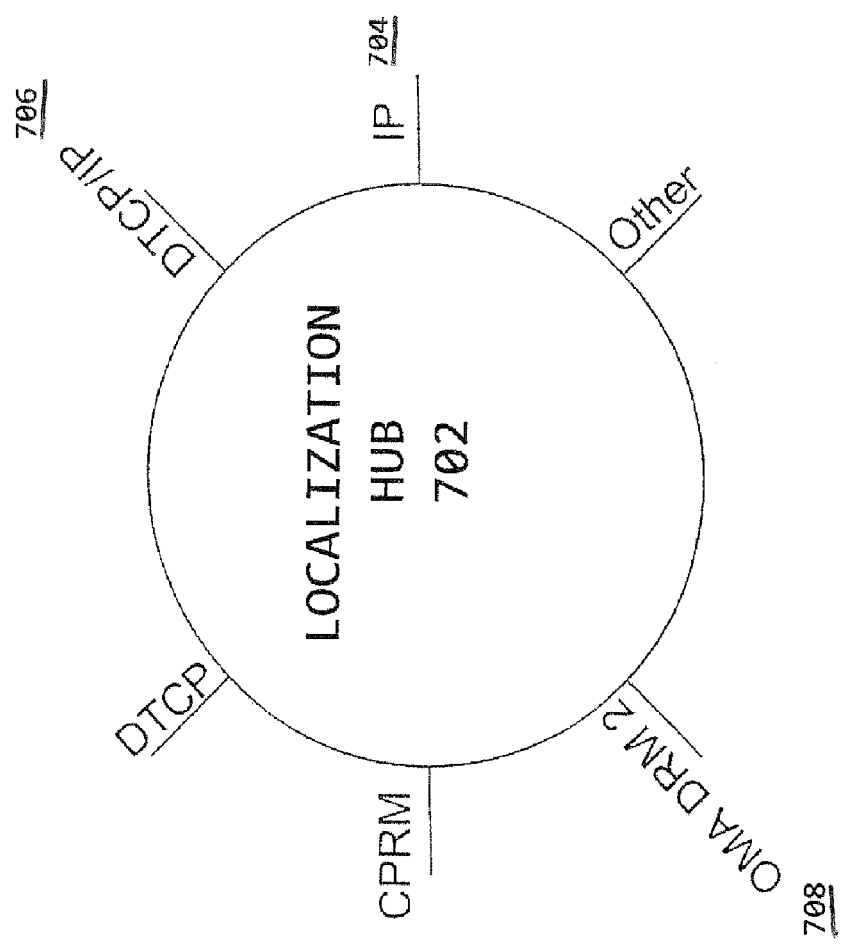
FIG. 7 is a schematic diagram of a localization hub according to one embodiment of the present invention.

FIG. 7 illustrates an "external" view of a localization hub 702 according to one embodiment of the present invention, showing examples of logical interfaces from various licensing authorities. In the example of FIG. 7, hub 702 also includes at least one interface 704 that runs the IP suite of services over some type of network, such as an Ethernet or WiFi (wireless fidelity) network. DTCP/IP and OMA DRM 2 interfaces 706 and 708 also run over IP networks, and the interfaces 706 and 708 may be multiplexed on a shared IP interface.

In one embodiment, client devices (not shown in FIG. 7) enroll with hub 702 over a network as described above in conjunction with FIGS. 1-5. In another embodiment, the hub 702 may be embedded within a client device itself (e.g., within a DVD player, a DVD writer, or some other type of media device), in which case an explicit enrollment exchange such as that described above by FIG. 2 (as well as by FIG. 9, below) may not be necessary. Client devices may use standard protocols to obtain a certificate from hub 702, such as the Simple Certificate Enrollment Protocol. In general, using mechanisms such as those just mentioned, hub 702 can associate different devices to, for example, a subscriber's home network so that those devices can prove their network association to each other as well as to devices outside the home network.

As used herein, the term "hub" refers generally to a localization point of activity. The spokes of the hub can be the interfaces mentioned above, although a spoke may also connect another hub. Thus, the term "hub" should not be construed as being limited to, for example, a repeater or other such device.

In essence, according to embodiments of the present invention, a hub 702 defines a home network (a "household"). There may be multiple hubs per household. For example, there may be multiple hubs per household when there are multiple address spaces in the household, such as when a router or firewall segments a home network using separate address assignments for the devices in the home network. In one embodiment, hubs that are on separate address segments can enroll with a "root hub" for the home network (the root hub may be one of the multiple hubs). Another embodiment uses an apparatus such as a dongle, token device, or smart card to associate hubs or to associate devices with hubs. In yet another embodiment, a human user places an authenticated phone call to an interactive voice response system in a hub. Those practiced and skilled in the art of computer security will see the benefit of using a human's physical action to make the association and thereby prevent devices operated by impersonators on the Internet from making a rogue association with a hub.

Figure 8:
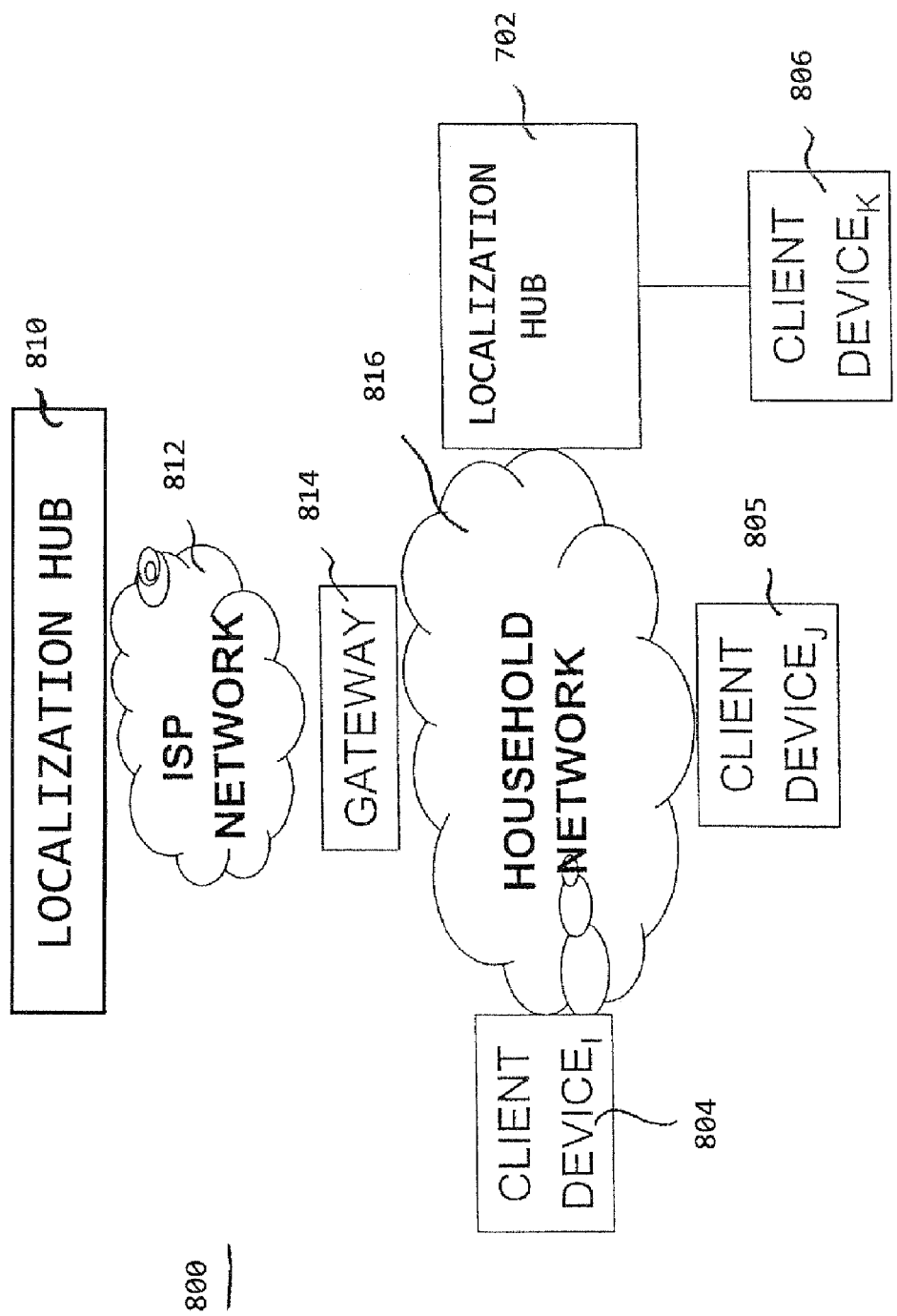
FIG. 8 is a block diagram of a hierarchical network of localization hubs according to an embodiment of the present invention.

FIG. 8 is a block diagram of a network 800 incorporating localization hub 702 (on household network 816) and localization hub 810 (on ISP network 812) according to an embodiment of the present invention. Network 816 may be referred to as a local area network (LAN), and network 812 may be referred to as a wide area network (WAN).

There may be more than one ISP network in communication with the household network 816. In the present embodiment, gateway 814 provides the communication interface between the household network 816 and one or more ISP networks. Client devices 804, 805 and 806 can be some type of network device (e.g., a network DVD player).

In one embodiment, household network 816 is an IEEE 802-compatible local area network.

In another embodiment, hub 702 is embedded in gateway 814. In yet another embodiment, hub 702 is embedded within one of the client devices 804, 805 and 806. In yet another embodiment, hub 702 is a separate device.

In the present embodiment, the household hub 702 associates (enrolls) with the ISP hub 810. In one embodiment, hub 702 enrolls with hub 810 as described above in conjunction with FIGS. 1-5. In another embodiment, a secure virtual private network (VPN) connects the hubs 702 and 810, using an IPsec connection, for example.

The association of the hub 702 with the hub 810 attests to the fact that hub 702 is installed at the location of a network-service subscriber. In one embodiment, "location" is the network location defined according to the address space of the network (e.g., the range of IP addresses allocated to the network), assigned for example by a DHCP server, and not the physical location of the network. In another embodiment, "location" identifies a service interface to a broadband network service, e.g., a specific address. In these embodiments, location is limited to the location of the hub when the hub was enrolled. However, the use of the term "location" can be extended to also allow mobile or multi-homed devices, for example, to access content from within a household. In one embodiment, a device can be associated with a hub using a "courier introducer" method that carries a pre-shared or public key to establish a secure association (a "trust") between devices. Easy Secure Device Positioning (EZSDP) (also called Easy Secure Device Deployment) allows a secure association to be made between devices. EZSDP uses a trusted introducer model, which can be implemented as a Web browser interface that allows a human user to establish a secure association between two devices. Alternatively, a telephone call can be used in place of a Web browser to accommodate circumstances in which a Web browser or personal computer is not available to make the introduction or association. Other methods such as smart cards or security dongles can also be used to establish a secure association between a hub and a device.

The association of the hub 702 with the hub 810 also means that hub 702 can be delegated the authority to enroll other devices (e.g., client devices 804-806) that are in the household network 816. The association of those other devices with hub 702 attests to the fact that those other devices are associated with the subscriber's household network. Note that, in one embodiment, the number and type of client devices on household network 816 may not be visible to the network-service provider. However, in another embodiment, the functionality of hub 702 is instead provided by hub 810, in which case the client devices on the household network would be visible to the network-service provider.

In the example of FIG. 8, client device 806 is directly connected to hub 702, while client devices 804 and 805 communicate to hub 702 through the fabric of the household network 816. In FIG. 8, hub 702 is not illustrated as lying on the path between the client devices 804-806 because, although hub 702 is accessible to and provides service to the client devices 804-806, content (e.g., a copyrighted work) does not necessarily pass through hub 702 on its way to a client device.

The client devices 804-806 may be licensed according to a licensing authority, as previously described herein. Also, hub 702 may have multiple IP or licensed-device interfaces.

Figure 9:
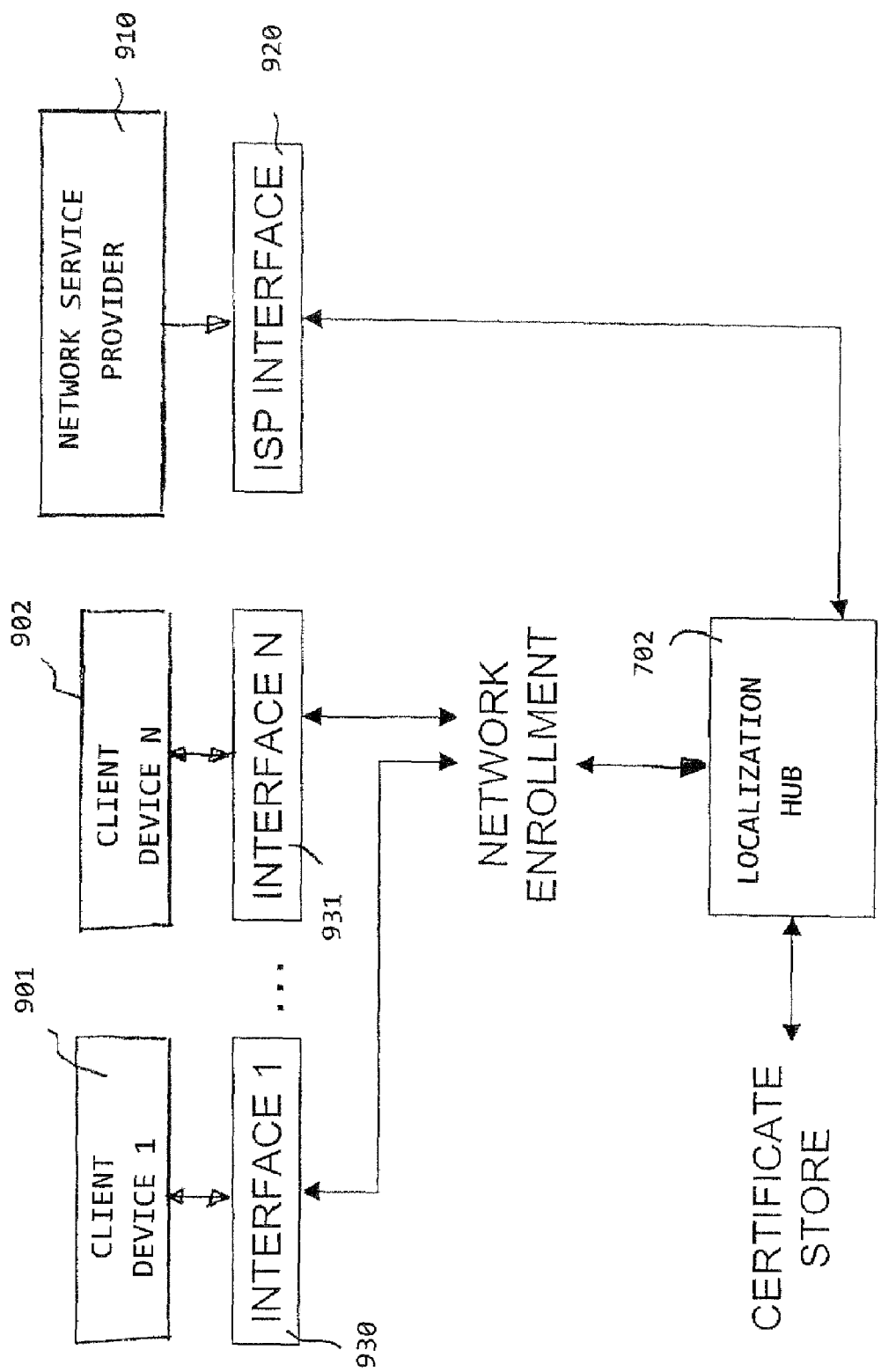
FIG. 9 is a data flow diagram of a network enrollment process across physical and logical interfaces between end-system devices and a localization hub according to an embodiment of the present invention.

FIG. 9 diagrams a network enrollment process according to an embodiment of the present invention. In the present embodiment, hub 702 associates with network-service provider's hub 910 via ISP interface 920. As part of the network enrollment process, hub 702 may fetch an appropriate credential ("certificate store"), in order to demonstrate that it is authorized by a licensing authority or manufacturer to enroll the requesting client device.

Requests for network enrollment from client (sink) devices 901 and 902 traverse a respective interface 930 or 931 to hub 702. The interfaces 920, 930 and 931 are not necessarily separate devices. As used here, the interfaces 920, 930 and 931 correspond to the various types of interfaces that are in use in a home network, as described above in conjunction with the examples of FIG. 7. Thus, the interfaces 920, 930 and 931 can be, in general, wired or wireless interfaces and more specifically, Ethernet, WiFi, etc., interfaces.

Figure 10:
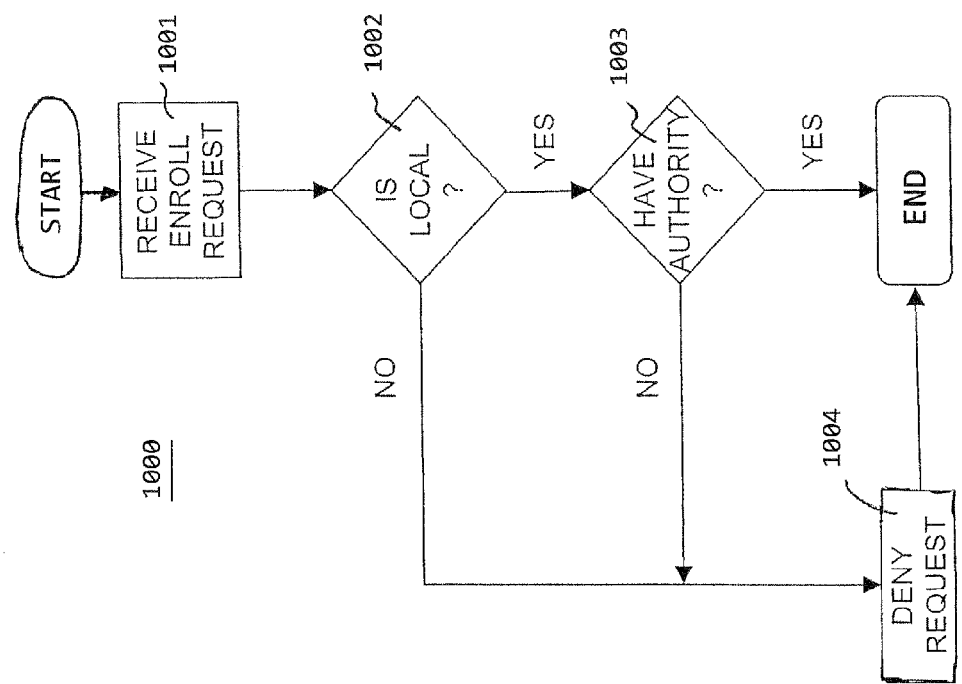
FIG. 10 is a flowchart showing a process for enrolling a device with a localization hub according to one embodiment of the present invention.

FIG. 10 is a flowchart 1000 showing a process for enrolling a device (e.g., a client device) with a localization hub according to one embodiment of the present invention. With reference also to FIG. 9, in step 1001, the localization hub 702 receives an enrollment request from a client device (e.g., client device 901).

In step 1002, hub 702 confirms that the requesting client device 901 is a member of the household network governed by hub 702 using the various methods described above such as pre-association by a "courier introducer." In one embodiment, if the client device 901 has the same pre-shared secret and also shares the same address space as hub 702, then it is demonstrated that client device 901 is a member of the household network, and flowchart 1000 proceeds to step 1003. Otherwise, flowchart 1000 proceeds to step 1004.

In step 1003, hub 702 confirms that it has the authority to enroll the requesting client device 901. In one embodiment, hub 702 confirms that the device 901 has the appropriate credential issued by a licensing authority or manufacturer and so can enroll the requesting client device 901. In one such embodiment, hub 702 confirms that it has a credential issued by the same licensing authority as the requesting client device 901. In another embodiment, hub 702 can enroll devices that have a credential such as a self-signed certificate that is authorized by a courier introducer or similar technique.

Hub 702 issues credentials (such as but not limited to X.509 certificates and symmetric secret credentials) to enrolled devices so that the credentials can be used for authorizing and controlling access in home network devices such as servers, firewalls, video recorders, cameras, jukeboxes and the like. According to embodiments of the present invention, devices that have enrolled with hub 702 can access resources controlled by other devices that have similarly enrolled with hub 702. This effectively restricts access by outsiders (including the network-service provider) to the home network unless they are expressly permitted (either by the network owner or a licensing authority) to establish an affinity relationship with the home network. Such an affinity relationship would allow outsiders to share controlled content (if so permitted by the license terms of a content work).

In step 1004, if it is not demonstrated that client device 901 is a member of the household network governed by hub 702 (see step 1002, above), or if the hub 702 is not authorized to enroll the requesting client device (see step 1003, above), then the enrollment request is denied.

Figure 11:
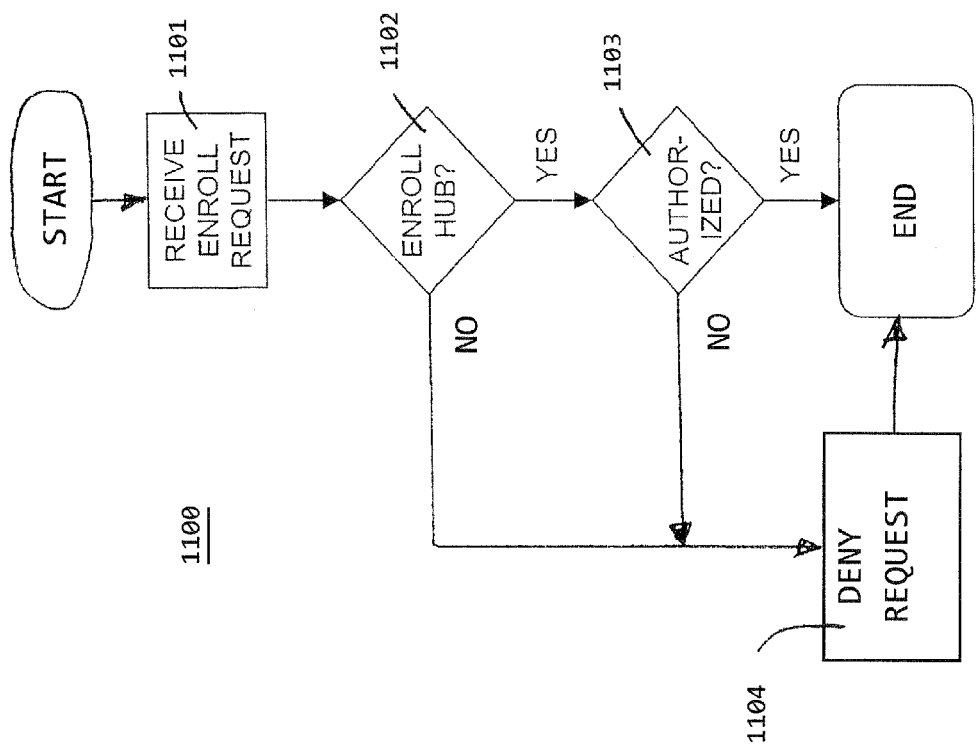
FIG. 11 is a flowchart showing a process for enrolling a localization hub with a second localization hub according to one embodiment of the present invention.

FIG. 11 is a flowchart 1100 showing a process for enrolling a hub (a "child hub") with another hub (a "parent hub") according to one embodiment of the present invention. In general, the process of flowchart 1100 is performed to associate multiple hubs with a particular household network. The child hub may be one of multiple hubs in a household network, and the parent hub may be a hub in the household network designated as the root hub. Alternatively, the parent hub may be the ISP localization hub 810 of FIG. 8.

In step 1101 of FIG. 11, the parent hub receives a request for enrollment from the child hub. In step 1102, the parent hub confirms that the requesting child hub is a member of the household network governed by the parent hub. In one embodiment, if the parent and child hubs are connected on the same DOCSIS cable interface or DSL interface then the child hub is authorized to enroll with the parent. In another embodiment, the child hub can be enrolled if it establishes an authorized and secure connection with the parent hub, such as an IPsec connection using the appropriate authorization (e.g., a pre-shared secret from courier introducer, a pass-phrase, etc.). If the child hub can be enrolled, then flowchart 1100 proceeds to step 1103. Otherwise, flowchart 1100 proceeds to step 1104.

In step 1103, the parent hub confirms that it has the authority to enroll the requesting child hub. For example, the parent hub determines whether it has the appropriate credential issued by a licensing authority or manufacturer and so can enroll the requesting child hub.

In step 1104, if it is not demonstrated that the requesting child hub is a member of the household network governed by the parent hub (see step 1102, above), or if the parent hub is not authorized to enroll the requesting child hub (see step 1103, above), then the enrollment request is denied.

After completion of the processes above, in the event that the home network is disconnected from the Internet, for example, home network (e.g., client) devices are not dependent on the hub at the service provider (e.g., hub 810 of FIG. 8) because hub 810 delegates authority to the household hub (e.g., hub 702 of FIG. 8). Thus, a device can provide a certificate to show that is enrolled with a service provider even when that service provider's interface is down and the device is accessing the Internet through some other link not associated with the service provider; this is one benefit to having a hub on the home network.

Although specific steps are disclosed in flowcharts 1000 and 1100 (FIGS. 10-11, respectively), such steps are exemplary. That is, embodiments of the present invention are well suited to performing various other (additional) steps or variations of the steps recited in flowcharts 1000 and 1100. It is appreciated that the steps in flowcharts 1000 and 1100 may be performed in an order different than presented, and that not all of the steps in flowcharts 1000 and 1100 may be performed.

In summary, according to embodiments of the present invention, a hub associates a device (or another hub) with a network (specifically, a household or home network). The hub may be attached to the home network, or it may be embodied in a network-service provider device. That is, client devices (e.g., media players) may enroll with a hub on the household network, or the device may enroll directly with a hub operated by the service provider.

Association (enrollment) with a network enables a hub or network device (e.g., a network entertainment device) to be identified as belonging to the network of a subscriber that is authorized to receive licensed content (e.g., a copyrighted movie). In contrast to the conventional art, which focuses on either device-specific access controls or content-specific access controls, embodiments in accordance with the present invention utilize network location or network association as a condition for receiving access to licensed data. Significantly, this is achieved within the context of the many protocols and algorithms used by the various licensing authorities.

Proxy Transcription of DRM Localization Schemes in A Hub

Referring back to FIG. 7, the subject invention can act as a proxy to "transcribe" the DRM localization of one FIG. 7 interface to another. For example, exchanges across the DTCP/IP interface 606 can be transcribed to and from the WAN IP interface 704. Such transcription can only be performed legally if the licensing authority that governs DTCP (the DTLA), for example, authorizes the hub to output DTCP/IP content over the IP interface, which is localized differently from the DTCP/IP method of constraining round-trip time and hop count. DTCP/IP has a localization scheme for its sources and sinks and so an output protocol must have a suitable localization method. The subject invention uses a network service credential to localize a home network to a network service. The protocol in one embodiment is IPsec Authentication Header (AH) protocol using the network service credential. In order to transcribe the DTCP/IP and AH flows, the hub participates in the key management that controls access to the decryption keys for the licensed data.

Licensed systems such as DTCP/IP and OMA DRM 2 encrypt licensed data as a means to limit access to those data. These licensed systems have key management protocols to manage and establish decryption keys for the data. An endpoint device will authenticate to some identity and prove that it is authorized to receive the key, which is most commonly called "authenticated key establishment" (AKE).

DTCP/IP and other licensed systems perform AKE using credentials that a licensing authority issues to authorized devices. As with any other Certificate Authority (CA) or Public Key Infrastructure (PKI), the licensing authority signs the credential, which identifies the device by the device's public key or name. The device presents the credential to a source of licensed data. This source requires a valid credential as a condition for granting access to the plaintext key. The device presents the credential to prove its authorization to receive licensed data (e.g., entertainment content works) and to gain access to the decryption key. In some cases the authorization decision consists of a single check of a digital signature to ensure that the relevant authority had issued the credential and has not subsequently revoked that credential. In other cases, licensed systems use complex authorization based on compliance with a rights specification as in Microsoft DRM 10 and OMA DRM 2. The present invention is useful for complex authorization DRM systems like Microsoft and OMA DRM that wish to localize content and devices as explained herein.

DTCP/IP systems can also benefit from use of the present invention because network localization is an effective means to extend DTCP/IP operation over a wide area. An embodiment of the present invention uses the hub to extend DTCP/IP operation across a wide area while ensuring that the mobile device is local to the other DTCP/IP devices on a home network. That assurance comes from the fact that the mobile device has previously enrolled (or registered) with the home network, such as an X.509 registrar in a DTCP/IP proxy (as in FIG. 2, for example).

Figure 12:
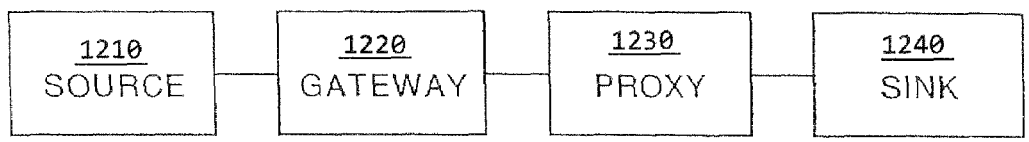
FIGS. 12 and 13 are block diagrams showing a localization hub in two localization proxy configurations according to embodiments of the present invention.
Figure 13:
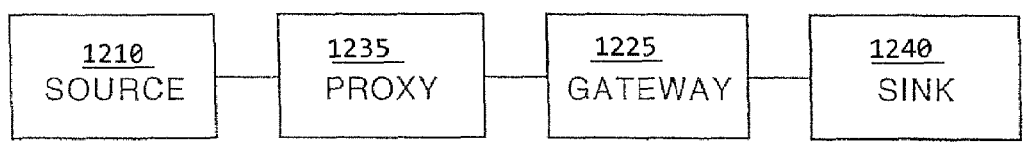

FIGS. 12 and 13 show a delivery path of a licensed work from a source 1210 to a sink 1240 according to embodiments of the present invention. Key management messages flow across all or part of the path. One or more hub devices (gateway 1220) may separate the source 1210 and sink 1240.

A hub that acts as a localization gateway proxies a connection between two different localization schemes. In the example of FIG. 12, the proxy 1230 is behind the sink's gateway and thus is on the sink's network, which in one embodiment is a private, home network. The gateway 1220 and the proxy 1230 are logical functions that may be co-located in the same physical device (e.g., the proxy 1230 might be integrated into the sink's gateway 1220).

In the example of FIG. 13, the proxy 1235 is behind the source's gateway and thus is on the source's network. The gateway 1225 and the proxy 1235 are logical functions that may be co-located in the same physical device (e.g., the proxy 1235 might be integrated into the sink's gateway 1225).

Referring to FIG. 13, the sink 1240 initiates an exchange with the source 1210, which has licensed content (data) that the sink 1240 is seeking to access. At some time before the sink 1240 initiates an authorization request, or following the first message from the sink 1240, the proxy 1235 runs an exchange with the source 1210. During an authorization exchange, the proxy 1235 identifies itself using a network service credential. If the source 1210 is able to authenticate the proxy 1235, it checks the access privileges of the proxy 1235. In one embodiment, an access control list is used to validate the signature (e.g., the source 1210 performs one or a small number of signature verifications before downloading a key to the proxy 1235). However, the exchanges could include many more checks of much more information, as described for OMA DRM 2.0.

The goal of the exchanges described above is to obtain a decryption key, but the protocol exchange between proxy 1235 and sink 1240 may differ from that between proxy 1235 and source 1210. In one embodiment, the proxy 1235 runs DTCP/IP to the sink 1240 and other protocols such as IKE with IPsec AH to the source 1210. In another embodiment, the source 1210 and proxy 1235 use a file encryption and authentication protocol, such as RFC 3394 key wrap (as used with OMA DRM 2.0), but the proxy 1235 runs DTCP/IP to the sink 1240. Once the proxy obtains the key, it may be authorized to distribute the key to other sinks that have the appropriate credentials, depending upon the particular policy that is in force by the licensing authority or local administration.

There may be cases where the licensing authority will not sanction the offloading of the key access-control function to the proxy 1235. In another embodiment, with reference to FIG. 13, the proxy 1235 merely relays the AKE messages to and from the device being proxied by proxy 1235. The proxy serves to localize the device and the content based on its network service credential. The proxy in such an embodiment is also useful in keeping remote access off of the sink's network (when it proxies the sink 1240) or the source's network (when it proxies the source 1210). Thus, the proxy 1235 is beneficial even when it does not have access to the key; that is, it can still protect privacy and limit network access.

In another embodiment, with reference still to FIG. 13, proxy 1235 passively acquires a key when the proxy 1235 is authorized to do so by the particular licensing authority. In such a "man-in-the-middle" embodiment, the proxy 1235 changes the messages between the source 1210 and the sink 1240 as a method to obtain the plaintext key. In contrast to the "man-in-the-middle" attack, here the man-in-the-middle is legitimate (when the proxy 1235 is authorized to function as a man-in-the-middle by the relevant authority). Thus, according to embodiments of the present invention, a proxy can complete an authenticated key exchange on behalf of some other device (e.g., a proxied device).

Figure 14:
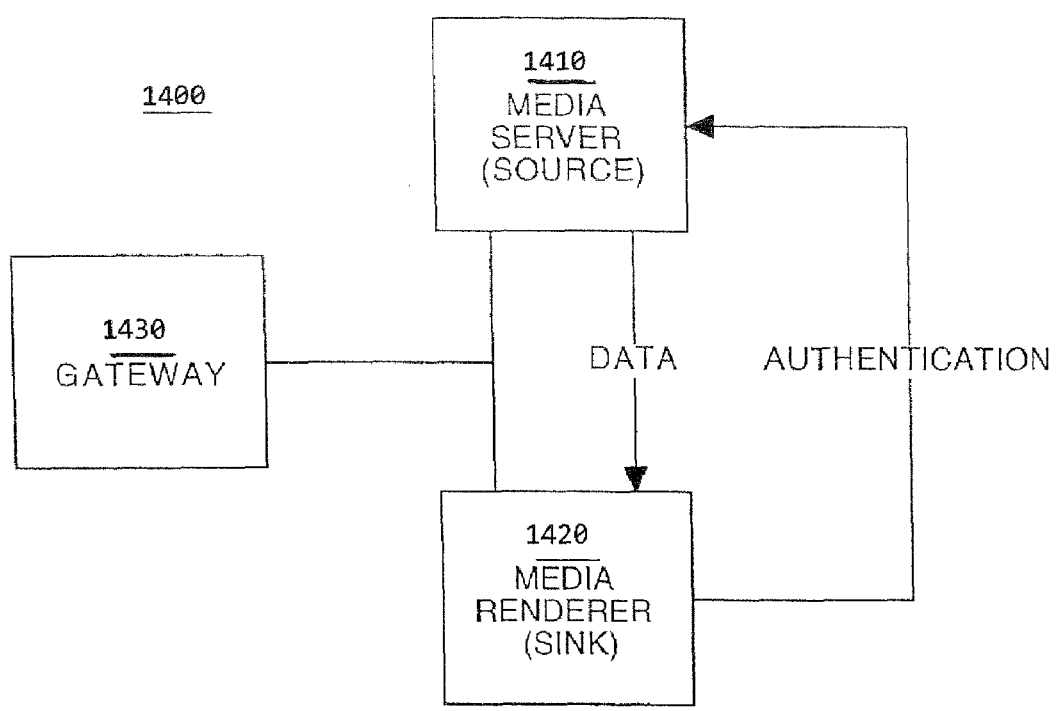
FIG. 14 is a block diagram of a localized network according to one embodiment of the present invention.

FIG. 14 is a block diagram of a local area network (LAN) or network composed of multiple LANs 1400 (e.g., a private, home network) according to one embodiment of the present invention. In the example of FIG. 14, LAN 1400 includes a media server (source) 1410, a media renderer (sink) 1420, and a gateway 1430 (which may be a residential gateway). Sink 1420 may be, for example, a set-top box or a digital media adapter (DMA).

In one embodiment, the source 1410, sink 1420 and gateway 1430 are enrolled in the home network and are issued credentials, as described previously herein (refer to the discussion in conjunction with FIGS. 1-5 above). Any device in the home network can manage enrollment; in one embodiment, enrollment is performed by gateway 1430, which acts as a registrar of network service credentials and localizes enrolling devices through some physical-world action such as using a pre-shared secret on a dongle, a passphrase, or other means.

In one embodiment, gateway 1430 is a residential gateway that, in addition to acting as both an interface and boundary between a wide area network (WAN) and a LAN or home network composed of multiple LANs as described above, also serves as an interface for quality-of-service (QoS) schemes and for the transport of content. In various embodiments, gateway 1430 may incorporate a router and a broadband modem, and can support the use of more than one type of home network media (e.g., IEEE 1402.11, 10/100 Ethernet, etc.). In an embodiment, a network service provider remotely manages gateway 1430; that is, the localization and proxy functionality of the gateway 1430 is visible to the service provider, and the service provider can install a configuration file or otherwise alter parameters of the gateway 1430. Although gateway 1430 has just been described as having certain characteristics and features, the present invention is not limited to a device having such characteristics and features.

In general, gateway 1430 couples LAN 1400 with a wide area network (e.g., the Internet). Gateway 1430 provides broadband connectivity to a WAN on one side, and provides access to home-network devices on the LAN side. The presence of network address translation (NAT) in gateway 1430 provides a boundary between public IP addresses (on the WAN side) and private IP address spaces (on the LAN side).

In the example of FIG. 14, sink 1420 authenticates itself to source 1410 in order to establish that sink 1420 is authorized to receive an item of content (data) from source 1410. Different mechanisms can be used for authentication and authorization. As mentioned above, in one embodiment, sink 1420 is enrolled and issued a credential, which is used to authenticate and authorize sink 1420. In one embodiment, the content is transmitted within LAN 1400 using DTCP/IP.

Figure 15:
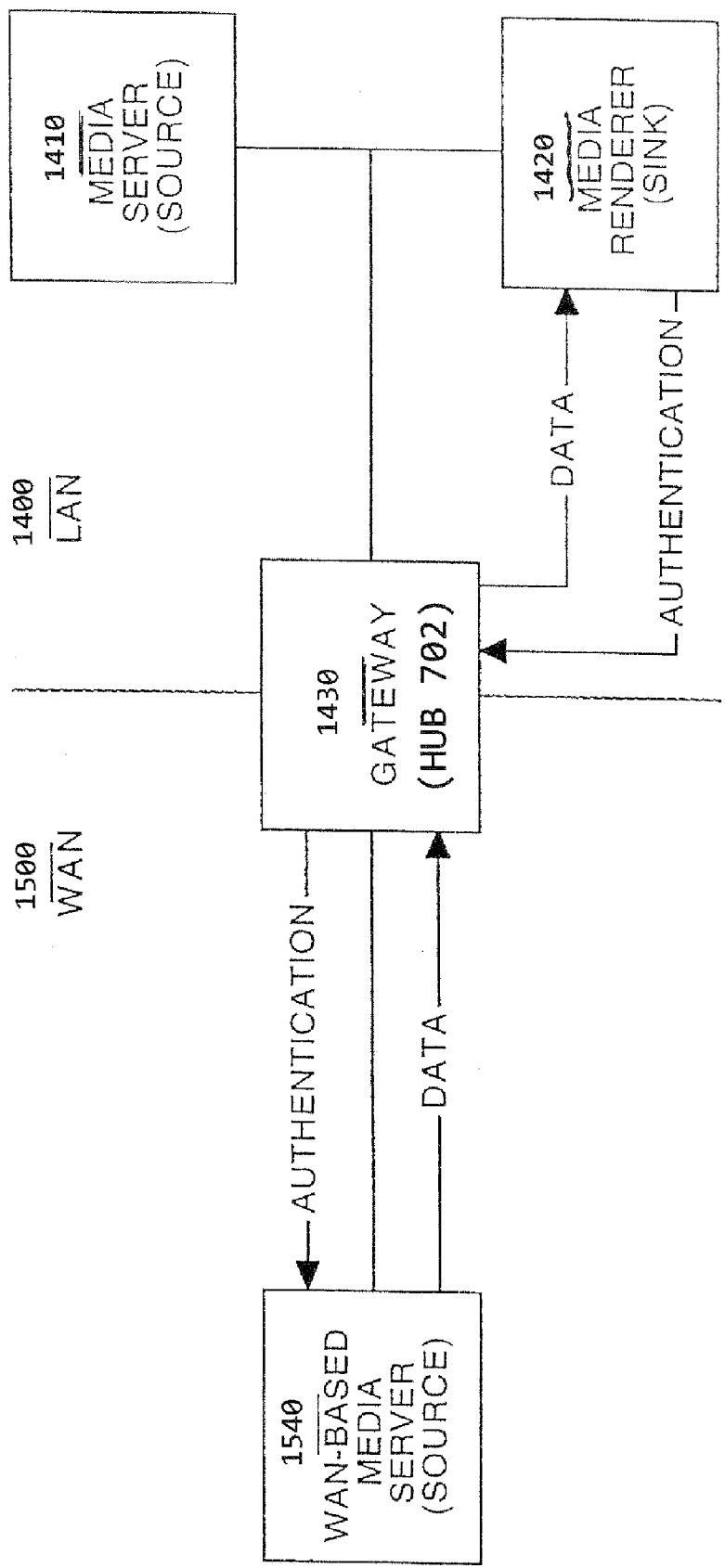
FIGS. 15 and 16 are block diagrams each showing localized control flows to a sink device and source device, respectively, according to embodiments of the present invention.
Figure 16:
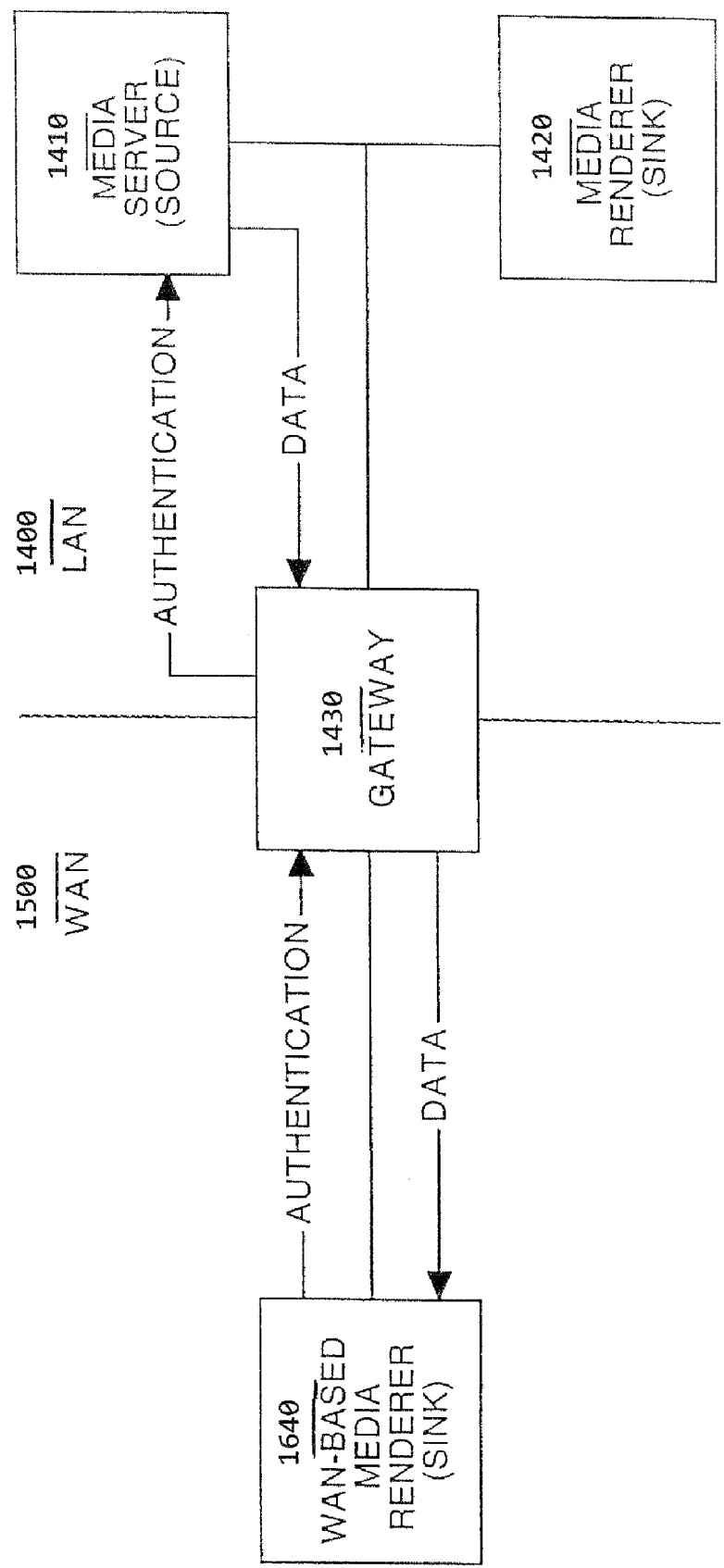

FIGS. 15 and 16 are block diagrams of a LAN 1400 (e.g., a home network) and a WAN 1500 (e.g., a broadband network such as the Internet) according to embodiments of the present invention. The networks of FIGS. 15 and 16 are analogous to the systems of FIGS. 12 and 13, discussed above.

With reference first to FIG. 15, gateway 1430 contains a hub 702 that acts as a proxy sink for content that is sourced from WAN-based media server (source) 1540, which is outside of LAN 1400. Also, gateway 1430 acts as a proxy source for sink 1420 located within the LAN 1400. The content from WAN-based source 1540 may be transported in accordance with a DRM scheme (e.g., Microsoft DRM 10). Accordingly, gateway 1430 performs DRM "transcription" of the localization method to convert from the WAN-based localization scheme to the localization scheme used by LAN 1400 (e.g., DTCP/IP). In an embodiment, the WAN-based localization uses a network service credential, and the gateway/hub maintains this credential on the WAN IP interface and ensures that the LAN interface to DTCP/IP devices conforms to DTCP/IP localization (e.g., a maximum of seven milliseconds and a packet "Time To Live" of three hops or less). Sink 1420 then decrypts the content from DTCP/IP and renders (visually or audibly) the content. In one embodiment, gateway 1430 does not decrypt the content.

In the example of FIG. 15, sink 1420 authenticates itself to gateway 1430, and gateway 1430 authenticates itself to WAN-based source 1540. Different mechanisms can be used for authentication and authorization. In one embodiment, the sink 1420 and gateway 1430 are credentialed, as previously described herein. WAN-based source 1540 may also be enrolled with LAN 1400 and appropriately credentialed. For example, source 1540 may be a mobile device that is a member of a home network, but has been temporarily transported outside of the home.

With reference now to FIG. 16, gateway 1430 acts as a proxy sink for content that is sourced from within the LAN 1400 (e.g., from source 1410). Gateway 1430 also acts as a proxy source for a media renderer (sink) 1640, which is outside of LAN 1400.

In the example of FIG. 16, gateway 1430 authenticates itself to source 1410, and sink 1640 authenticates itself to gateway 1430. In one embodiment, the source 1410 and gateway 1430 are credentialed, as previously described herein. Sink 1640 may also be enrolled with LAN 1400 and appropriately credentialed. For example, sink 1640 may be a mobile device that is a member of a home network, but has been temporarily transported outside of the home.

However, content within LAN 1400 is transported according to DTCP/IP, which will not function on WAN 1500. Accordingly, gateway 1430 performs localization transcription to convert from DTCP/IP localization to a localization scheme that is used by sink 1640 and which can be used to authorize access over WAN 1500. Thus, according to embodiments of the present invention, an item of content that is copy-protected according to DTCP/IP only travels as far as gateway 1430. Gateway 1430 then transcripts the content into a format that is suitable for transporting the item of content across WAN 1500 to sink 1640. In one embodiment, that format is a simple encapsulation of DTCP/IP messages in IPsec Authentication Header (AH) protocol.

Generally speaking, an item of content on LAN 1400 is "wrapped" using the DTCP/IP scheme. In one embodiment, gateway 1430 "unwraps" the item of content, then "rewraps" it in a format that can be used outside of LAN 1400 (a scheme other than DTCP/IP). In an alternative embodiment, gateway 1430 "encapsulates" messages received on LAN 1400 in another protocol such as IPsec AH and forwarded onto WAN 900. Messages from WAN 1500 are "decapsulated" and forwarded onto LAN 1400. These schemes are well known to persons who are knowledgeable in the art of network security. The latter scheme does not require gateway 1430 to have access to the content key whereas the former scheme does. Both embodiments are supported by the subject invention in a localization hub that proxies devices on two different localization domains.

Although gateway 1430 is described as an element separate from the other devices (e.g., sinks and sources) in LAN 1400, the functionalities provided by gateway 1430 can alternatively be implemented on any of the devices in LAN 1400. That is, for example, a source or sink device on LAN 1400 can provide dual functionality, operating as a source or sink and also operating as a gateway device.

Figure 17:
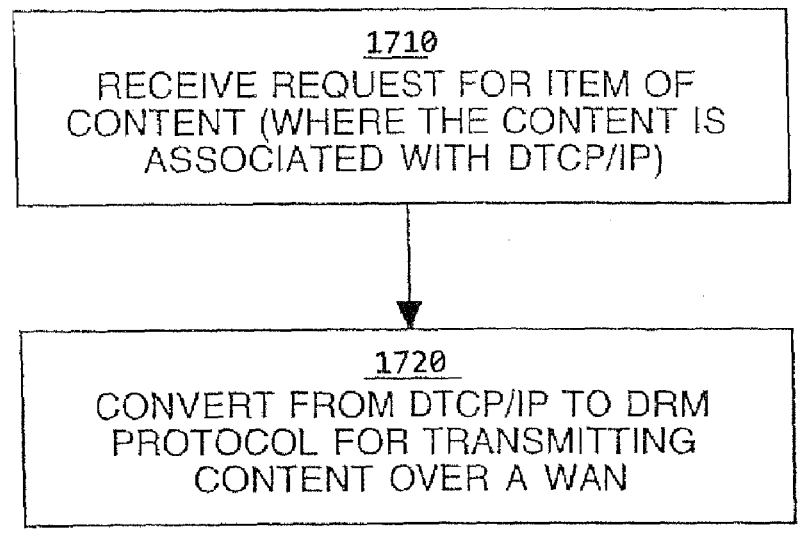
FIG. 17 is a flowchart of a method for managing the distribution of content according to one embodiment of the present invention.

FIG. 17 is a flowchart 1700 of a method for managing the distribution of content according to one embodiment of the present invention. Although specific steps are disclosed in flowchart 1700, such steps are exemplary. That is, embodiments of the present invention are well suited to performing various other (additional) steps or variations of the steps recited in flowchart 1700. It is appreciated that the steps in flowchart 1700 may be performed in an order different than presented, and that not all of the steps in flowchart 1700 may be performed. In one embodiment, flowchart 1700 is implemented on a gateway (e.g., gateway 1430 of FIGS. 15 and 16).

In step 1710 of FIG. 17, in one embodiment, a request for an item of content is received from a sink device. The request is sent over a WAN (e.g., the Internet). The item of content resides on a LAN. Distribution of the item of content within the LAN uses a first localization method and protocol that prevents the item of content from being distributed outside the LAN (e.g., DTCP/IP).

In step 1720, for the requested item of content, the gateway converts the first localization method and protocol to a second localization method and protocol. The localization method is the network service credential and the procedures for enrollment that associates devices with a network service. The localization protocol encapsulates, wraps, or unwraps content to optimize transport over a WAN or LAN. The item of content can then be forwarded to the sink device according to the second localization method and protocol. In one embodiment, the sink device authenticates itself using a credential that binds the sink device to the LAN, thus demonstrating that it is authorized to receive the content that is localized to a network.

Thus, embodiments of the present invention can help resolve consumer and industry concerns with the issue referred to as "mobility" (that is, the ability for individuals to access home-based content they own from outside their home) and "affinity" (allowing friends, family or other persons access to household-licensed content works). Through use of the subject invention, local content from inside a home network can be authorized and transported to an authorized device outside the home network without violating household-based localization constraints (e.g., when data is licensed strictly to household devices).

Also through the use of the present invention, remote content from outside the home network can be authorized and transported to devices that are enrolled with the home network. The present invention provides localization guarantees that the device is associated with the household and no other (or few others, etc.). A device such as a residential gateway provides this localization guarantee.

Embodiments of the present invention are thus described. While the present invention has been described in particular embodiments, it should be appreciated that the present invention should not be construed as limited by such embodiments, but rather construed according to the below claims.

What is claimed is:

1. A gateway for coupling a first private home network to a second different network, the gateway comprising:
 a first interface to communicate with the first private home network;
 a second different interface to communicate with the second different network, the second interface coupled to the first interface such that a network device located in the first private home network can exchange communications with the second network through the gateway; and
 localization circuitry integrated into the gateway and coupled to the first and second interfaces, the localization circuitry configured to:
 enroll the gateway in a network service by obtaining a credential from a provider device located outside the first private home network and then storing the credential on the gateway;
 receive a request from the network device located in the first private home network to enroll in the network service for controlling access to DRM content;
 verify that the requesting device is a member of the first private home network; and
 issue the credential to the network device when membership is verified, said issuing of the credential allowing the network device to demonstrate possession of the credential to obtain access to the DRM content that is both located outside the first private home network and associated with the network service;
 wherein the localization circuitry is further configured to verify membership by determining whether a first IP address for the network device belongs to a same IP address range as a second IP address for the gateway when both IP addresses identify a same subnet, and in addition to the address range verification, determining whether the network device has demonstrated knowledge of a same preshared credential; and
 wherein the network device is at least one selected from a group of a household device, a mobile device, a visitor device and a foreign device.

2. The gateway of claim 1 wherein the issued credential is usable by the network device for obtaining a decryption key usable for decrypting the DRM content using the decryption key.

3. The gateway of claim 2 wherein the issued credential is usable by the network device for obtaining the decryption key from another device that is separate from the gateway.

4. The gateway of claim 1 wherein the credential identifies a name of a service provider that is a licensing authority for the DRM content.

5. The gateway of claim 1 wherein the credential identifies address information for locating a service provider to obtain a decryption key for the DRM content.

6. The gateway of claim 1 wherein the localization circuitry is further operable to, before issuing the credential, identify an input indicating that a user of the private home network has used an interactive voice response system to obtain authorization to access the DRM content using the network device.

7. A method for controlling access to DRM content associated with a network service using a hub, the hub having a localization circuitry, said method comprising:
 receiving over a first interface of the hub a credential thereby enrolling the hub in the network service;
 receiving over a second different interface of the hub a request to enroll a network device in the network service;
 verifying that the network device is located in a network, the network being one for which the hub is a single point of entry and exit; and
 issuing the credential to the network device when the network device is located in the network, said issuing of the credential allowing the network device to demonstrate possession of the credential to a remote device located outside the network for obtaining access to the DRM content;

wherein the localization circuitry is configured to verify membership by determining whether a first IP address for the network device belongs to same a IP address range as a second IP address for the hub when both IP addresses identify a same subnet, and in addition to the address range verification, determining whether the network device has demonstrated knowledge of a same preshared credential; and wherein the network device is at least one selected from a group of a household device, a mobile device, a visitor device and a foreign device.

8. The method of claim 7 wherein issuing said credential to the network device allows the network device to demonstrate possession to obtain a decryption key from the remote device, the decryption key for decrypting and accessing the content.

9. The method of claim 7 wherein the credential is provided to the network device in response to a determination that the first IP address for the device and the second IP address for the hub are both administratively scoped by a same Dynamic Host Configuration Protocol (DHCP) server of the network.

10. The method of claim 7 wherein the hub transfers the credential to the network device according to the verification.

11. The method of claim 7 wherein the hub provides access to a wide area network for the network device.

12. The method of claim 7 wherein the hub is a client device located in the same network as the remote device.

13. The method of claim 7 further comprising the hub obtaining the credential from a same remote computer that provides a decryption key usable for decrypting the DRM content.

14. A system for controlling access to DRM content associated with a network service using a gateway, the gateway having a localization circuitry, said system comprising:

means for receiving a credential from a provider device located outside a private network, the credential for associating the network service with the gateway that is a single point of entry and exit for the private network;

means for receiving a request to enroll a network device in the network service;

means for determining whether the network device is part of the private network; and means for issuing the credential to the network device when the network device is part of the private network, said issuing of the credential permitting the network device to transfer communications through the gateway and outside of the private network, the communications for demonstrating possession of the credential and obtaining access to the DRM content;

wherein the localization circuitry is configured to verify membership by determining whether a first IP address for the network device belongs to a same IP address range as a second IP address for the gateway when both IP addresses identify a same subnet, and in addition to the address range verification, determining whether the network device has demonstrated knowledge of a same preshared credential; and wherein the network device is at least one selected from a group of a household device, a mobile device, a visitor device and a foreign device.

15. The system of claim 14 wherein said private network comprises a plurality of client devices, wherein one of said client devices comprises said gateway.

16. The system of claim 14 wherein the gateway couples the private network to a wide area network.

* * * * *

UNITED STATES PATENT AND TRADEMARK OFFICE
CERTIFICATE OF CORRECTION

PATENT NO. : 7,340,769 B2 Page 1 of 1
APPLICATION NO. : 11/260531
DATED : March 4, 2008
INVENTOR(S) : Baugher It is certified that error appears in the above-identified patent and that said Letters Patent is hereby corrected as shown below:

At column 19, line 6, please replace "same a IP" with --a same IP--.
At column 20, line 26, please replace "has demonstrated knowledge" with --has a demonstrated knowledge--.

Signed and Sealed this

Twenty-fourth Day of March, 2009

JOHN DOLL
*Acting Director of the United States Patent and Trademark Office*